Oct. 24, 1961
B. S. FRIEDMAN ET AL
3,005,846
PRODUCTION OF ACIDS AND ESTERS
Filed April 6, 1959
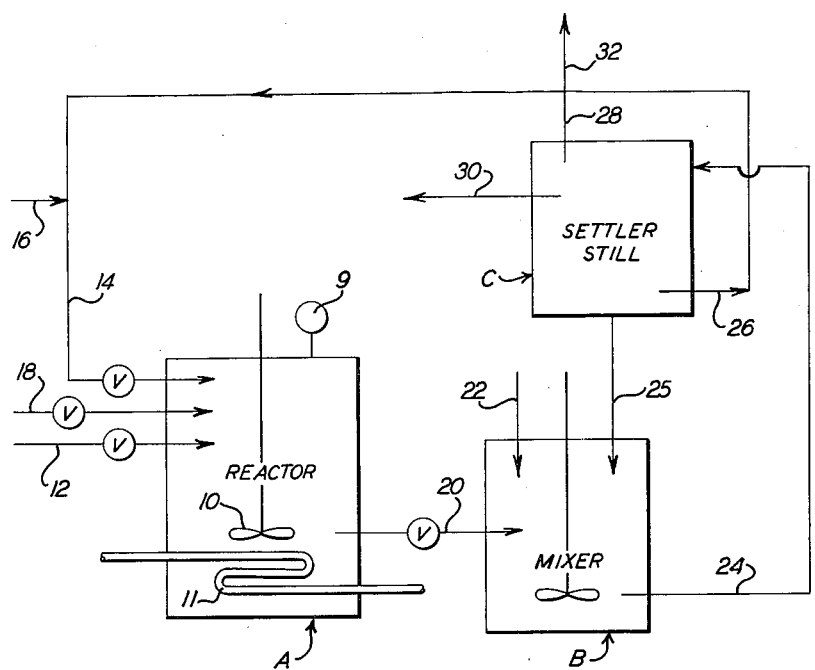
INVENTORS.
BERNARD S. FRIEDMAN
SHERWOOD M. COTTON
ATTORNEYS

United States Patent Office 3,005,846
Patented Oct. 24, 1961

3,005,846
PRODUCTION OF ACIDS AND ESTERS
Bernard S. Friedman, Chicago, and Sherwood M. Cotton, Harvey, Ill., assignors to Sinclair Refining Company
Filed Apr. 6, 1959, Ser. No. 804,387
11 Claims. (Cl. 260—497)

This invention relates to the synthesis of esters and carboxylic acids by the reaction of carbon monoxide and a monoolefin, straight or branched chain, in the presence of a hydrogen fluoride-alcohol mixture or a branched olefin in the presence of a hydrogen-fluoride water mixture. The products of this reaction are contacted with alcohol or water, the reagent being selected consistent with the catalyst mixture to produce the ester or the acid, respectively. The acid or ester is recovered while the hydrogen fluoride, usually containing certain proportions of water or low-boiling alcohol is recycled to the CO reaction.

In performing the process of the invention stoichiometric amounts of water or alcohol may be used with a stoichiometric amount of CO and olefin; for example, when a monoester is to be made, approximately equimolar amounts of the olefin and carbon monoxide can be reacted while in contact with hydrogen fluoride and part of the total quantity of a monohydric alcohol. The reacted mass may then be contacted with the remaining quantity of the alcohol needed to make up a stoichiometric amount. The ester so produced is of the type RCOOR' where the R group is the hydrocarbon group derived from the olefin and the R' group is the hydrocarbon group derived from the alcohol. Polyhydric as well as monohydric alcohols can be employed and in this case polyesters may be manufactured by substituting for one mole of monohydric alcohol half a mole of a glycol, one third mole of a triol, etc. and mixed esters may be obtained with these or other proportions.

While it is known that pure HF will cause a reaction between an olefin and carbon monoxide, the process of this invention, by careful control of the proportions of reactants involved, enables the HF from the water or alcohol contacting to be recycled to the olefin-CO reaction without intermediate purification or reconcentration, and thus realizes significant savings in the amount of HF and in the equipment used. This carboxylation reaction is generally performed in the liquid phase.

When the HF-alcohol mixture is used in the reaction with CO, the olefin can be an aliphatic straight or branched chain monoolefin such as propylene, isobutylene, and polymers of these materials. Cyclic olefins also may be used. In general, the olefin can be of any chain length desired and frequently contains three or more carbon atoms, with 20 carbon atoms being the preferred upper limit. When the HF-water mixture is used in the reaction with CO, the olefin can be the same as those outlined above, however, the straight-chain olefins react to give a mixture of acid and "self-ester." See copending application Serial No. 817,448, filed June 2, 1959. The HF-water process is especially useful with branched chain monoolefins and cyclic monoolefins with or without alkyl side chains, such as isobutylene, propylene tetramer, cyclohexene, etc.

The process of this invention is in general effective to convert olefins to acids having one more carbon atom than the olefin, or to an ester of this acid. For example, the process converts propylene to isobutyric acid or an isobutyrate, isobutylene to trimethyl acetic acid or a pivalate, propylene tetramer to a $C_{13}$ acid or a $C_{13}$ acid ester, nonylene dimer to a $C_{19}$ acid, etc. In addition, polymerization and sometimes depolymerization of the olefin may occur producing perhaps sizeable quantities of acids having $n(C_x)+1$, carbon atoms where $n$ is a whole number and $x$ is the number of carbon atoms in the olefin starting material.

The alcohol, whether mono- or polyhydric, may be primary or secondary, aliphatic including cycloaliphatic, and of any desired length. Tertiary alcohols are to be avoided as they are easily dehydrated in the process. Methanol, ethanol, isopropanol and other short chain, non-tertiary lower aliphatic alcohols are preferred from the standpoint of economy and volatility when the esters are to be used as intermediates in the preparation of complex esters, etc. Highly useful esters are made by using alcohols of up to about 20 carbon atoms. Alcohols such as 2-ethylhexanol may be used to produce satisfactory ester synthetic lubricants and lubricant thickeners. Oxo alcohols and those derived by hydrogenating fatty acids such as lauric and stearic acids are also suitable for use in this process. Polyols, such as ethylene glycol, propylene glycol, etc., ordinarily give a reaction product containing a mixture of mono- and diesters depending on the ratio of polyol to acyl fluoride.

The HF-alcohol mixture in the reaction zone preferably contains about 2–15 mole percent alcohol. Although up to 25 mole percent alcohol may be used, too high a percentage will frequently lead to increased polymerization of the olefin. Also, it is advantageous to avoid the presence of any water when the HF-alcohol mixture is used; water will cut down the yield of ester. When a long-chain monohydric alcohol or a polyol is used, the HF mixture separated from the ester product for recycle to the CO reaction will contain only traces of the alcohol. After the carbonylation reaction with carbon monoxide, enough alcohol is added to the reaction product to bring the total amount of alcohol used up to the stoichiometric amount needed to produce the ester. A slight excess of alcohol may be used to insure complete conversion. When a low molecular weight alcohol is used, the excess is removed, along with the HF catalyst, by fractional distillation of the ester product, and the alcohol-HF mixture is returned to the carbonylation reaction.

In organic acid manufacture, a water-HF mixture containing about 5 to 30% water is used. This percentage figure represents either weight percent or mole percent, since water and HF have about the same molecular weight. A mixture of water and HF containing about this range of water is the mixture generally separated by fractional distillation from the organic acid product after the contact with additional water and this mixture may be recycled without further treatment to the carbonylation reaction with CO. The higher the proportion of HF in the mixture the greater the conversion of the branched or cyclic olefin to acid in each pass so that it may be preferred to add more HF or remove some water from the mixture but this is usually not necessary. After the carbonylation reaction more water is added to the reaction product to bring the total amount of water used to the stoichiometric amount needed for conversion to organic acids. An excess of water is recovered with the HF when the organic acid product is fractionally distilled; in fact, water, as well as alcohols boiling in the neighborhood of about 100° C. or below are preferred to be present in the final reaction product in excess, e.g. in excess of the stoichiometric amount as determined by the moles of CO reacted. In this situation they actually aid in the recovery of the hydrogen fluoride when the reaction product is fractionally distilled.

The process will be more readily understood by reference to the accompanying schematic flow-sheet diagram. In this diagram, A represents a pressurized reaction vessel equipped with a suitable pressure gauge 9, agitator 10, and a heating or cooling coil, 11. The olefin reactant is led to this vessel by line 12; the HF-water or HF-alcohol mixture is supplied to the vessel by the line 14. Additional HF, water or alcohol may be added through the line 16 to the recycle HF mixture in line 14 when it is desired to adjust the proportions of these materials. Line 18 is provided to conduct CO to the vessel A.

Mixer B is provided for completion of the conversion of the CO reaction product to the acid or ester. The reaction product containing the hydrogen fluoride catalyst is conducted from vessel A to the mixer through valved line 20, and the water or alcohol is added through line 22.

Settler-still C is provided for fractionation of the water-HF-acid or alcohol-HF-ester mixture conducted to it by line 24. Any excess water or alcohol which settles out of the mixture in a lower layer may be conducted back to mixer B by line 25 or to reactor A by line 26. The HF-water or HF-alcohol mixture, when the alcohol is low boiling, is removed as a vapor through line 28. The acid or ester product is removed through line 30, the ester containing any excess of higher boiling alcohol used. Line 14 conducts the HF-containing vapor or liquid back to reactor A while line 32 is provided for removal of all or part of the vapor from the system.

The olefin, HF and water or alcohol are added to the reactor A with agitation, in the proportion of about 2 to 20 moles HF to 1 mole olefin, preferably about 2 to 5 moles HF per mole of olefin. The vessel A is then pressurized with CO from the line 18 to a pressure of say about 1 atmosphere to 100 or even 1000 p.s.i.g. or more partial pressure of CO. If a countercurrent contact system is used for the CO, the partial pressure of this gas may measure less than one atmosphere in the exit gas line because this gas is being scrubbed out. It is advisable to operate at elevated carbon monoxide pressures in order to minimize olefin side reactions such as polymerization and cleavage. The CO may be mixed with an inert gas, such as hydrogen, carbon dioxide or $CH_4$ if desired.

The reaction with carbon monoxide can be conducted at a temperature of about 10° to 200° F. or more. The reactants, other than the CO are generally kept in the liquid phase. The most advantageous temperature to use is dependent on the concentration of HF in the mixture. For example, where the HF-water mixture contains about 5% water, a temperature of about 20 to 150° F. is preferred; about 10% water indicates a preferred temperature of about 50–150° F. while with about 25% water the reaction is best conducted at about 100–200° F. Where an HF-alcohol mixture is used, similar temperature ranges are advised. Also, once the reaction has started it usually is permissible to allow the temperature to fall below that required to initiate the reaction. If an elevated temperature is required, steam may be passed into coil, 11, or other suitable means may be used to bring the reaction mixture to reaction temperature. After the reaction is initiated, cold water is passed through the coil to take up the heat liberated by the reaction.

The reaction is usually complete in 1 minute to 1 hour. This completion is signalled by a halt in the fall of the CO pressure. Agitation is discontinued and the contents of vessel A are transferred to vessel B, where water, preferably at the contacting temperature of about 150° to 300° F., or alcohol, preferably at the contacting temperature of about 75–175° F., is added to supply the balance of the stoichiometric amount needed to give the acid or the ester. Alternatively the water or alcohol may be added directly to vessel A when the CO reaction ceases. The acid or ester along with the HF and some excess water or alcohol is then conducted to a settler-still, C, wherein the mixture is allowed to settle, preferably at a depressed temperature. The lower layer, if any, contaning HF along with some excess water or alcohol is conducted to B through line 25 or recycled through line 26 to the reactor A. After removal of this layer, heat is applied to vaporize the remaining HF, along with some water or alcohol if of low boiling point. The vapor is removed through line 28 and may be recycled to reactor A through line 14, or, if the vapors are substandard in HF content or if the system contains too much HF, they may be removed through line 32. Additional HF, water or alcohol may be added through line 16. The product acid or ester is removed through the line 30 and may be subjected to further purification if desired.

The following examples of the process of the invention are intended to be illustrative only and not limiting.

EXAMPLE I 183 grams of isobutylene (3.27 moles) was charged with stirring for 44 minutes to the reactor along with a mixture containing 204 g. (10.2 moles) HF and 32 g. (1 mole) methanol. The reactor was pressurized with CO to 575 p.s.i.g., and a water bath was placed around the reactor to maintain the contents at 80° F. The reaction mixture was stirred an additional 26 minutes, after which the CO was vented and the reaction mass conducted to vessel B, which contained about 65 g. methanol at a temperature of 100° F. Subsequent separation gave a yield of 240 grams methyl trimethyl acetate.

EXAMPLE II

Where the same reaction was conducted using an HF-alcohol mixture containing 22 mole percent alcohol, the reaction with CO was slow below 130° F. but quite rapid at 160°. The product consisted largely of methyl esters of acids derived from polymers of isobutene, indicating that higher proportions of alcohol in the HF mixture may lead to some olefin polymerization.

EXAMPLE III

Butene-1 (193 grams) was contacted CO at 525–370 p.s.i.g. and 116° F. in the presence of 206 grams of anhydrous HF containing 32.5 grams of dry methanol. The amount of CO absorbed was 64 grams. Methanol (64 grams) was then added during 15 minutes at 115–120° F. and the stirring continued for 10 minutes additional. Distillation yielded 103 g. methyl ester of 2-methylbutyric acid, B.P. 116–120° C., 136 g. methyl ester of $C_9$ acids, B.P. 185–188° C., $n_D^{20}$ 1.4211, and 28 g. methyl ester of $C_{13}$ acids B.P. 257–269°.

EXAMPLE IV

A mixture of 213 g. HF and about 20 g. water, recovered from a previous reaction by distillation, is put in a stirred autoclave. The autoclave is charged with CO and maintained at 400 to 280 p.s.i.g. 180 g. isobutylene is added at 75° F. during 70 minutes and the stirring continued for 30 minutes. The uptake of CO is about 63 grams. The liquid product is added to about 40 grams water at −80° C., the mixture stirred, allowed to come to room temperature and heated to 200° F. with stirring for 1 hour. The product is predominantly pivalic acid plus some $C_9$ and $C_{13}$ acids.

It is frequently desirable to give the reaction product a treatment with an alkali metal hydroxide or alcoholate to saponify or esterify, as the case may be, any traces of acyl fluoride in the reaction product. These traces of fluoride are susceptible to decomposition in the subsequent distillation. For example, when a methyl ester is being prepared the product of the carbon monoxide reaction may be heated with a small amount, say 2% of $NaOCH_3$ at a temperature of about 100° to 275° F. Alternatively in this situation sodium methoxide may be fed directly to the distillation column with the ester.

A further series of reactions was conducted in which diisobutylene was reacted with carbon monoxide in the presence of various mixtures of hydrogen fluoride and water. After contacting with water, the samples were treated, before distillation, with KOH, and then acidified. The results are reported in Table I.

Table I

| Example | V | VI | VII |
|---|---|---|---|
| Diisobutylene: | | | |
| grams | 710 | 655 | 665 |
| moles | 6.33 | 5.85 | 5.93 |
| time (minutes) to add | 143 | 148 | 166 |
| time additional stirring | 10 | 25 | 54 |
| CO: | | | |
| pressure (p.s.i.g.)— | | | |
| at start | 500 | 500 | 500 |
| at end | 70 | 150 | 190 |
| moles absorbed | 5.08 | 5.33 | 4.3 |
| Moles CO absorbed/mole DIB | 0.8 | 0.91 | 0.73 |
| Catalyst: | | | |
| HF—grams | 280 | 244 | 223 |
| $H_2O$—grams | 30 | 60 | 75 |
| $H_2O$—percent | 9.7 | 19.7 | 25.2 |
| Temperature, °F | 70 | 100 | 135 |
| Product Acids: | | | |
| $C_5$: | | | |
| grams | 202 | 113 | 106 |
| moles | 1.98 | 1.1 | 1.1 |
| yield (percent) | 15.7 | 9.4 | 9.3 |
| $C_9$: | | | |
| grams | 367 | 427 | 436 |
| moles | 2.33 | 2.7 | 2.76 |
| yield (percent) | 36.8 | 46.2 | 46.6 |
| $C_{13}$: | | | |
| grams | 103 | 258 | 76 |
| moles | 0.48 | 1.2 | 0.36 |
| yield (percent) | 11.4 | 30.9 | 9.1 |
| Higher: | | | |
| grams | 113 | 78 | 106 |
| yield (percent) | 13.3 | 9.9 | 13.3 |
| Total: | | | |
| grams | 785 | 876 | 724 |
| yield (percent) | 87.2 | 96.4 | 78.3 |

We claim:

1. A method which comprises reacting monoolefin and carbon monoxide in the presence of an HF mixture containing at least about two moles of hydrogen fluoride per mole of monoolefin at a temperature of about 10 to 200° F. and a pressure sufficient to maintain the liquid phase, said HF mixture also containing an agent selected from the group consisting of about 5 to 30% water and about 2 to 25 mole percent monohydric alcohol, contacting the product of this reaction with an agent selected from the group consisting of monohydric alcohol and water, separating a mixture of HF and said agent and recycling this mixture to the carbon monoxide reaction, said agents being selected consistently, and recovering an ester when monohydric alcohol is selected and an organic acid when water is selected.

2. The process of claim 1 where the alcohol is one which boils below about 100° C. and the HF mixture is separated by distillation.

3. The process of claim 1 in which the olefin has 3 to 20 carbon atoms.

4. The process of claim 1 where the partial pressure of the carbon monoxide is above about 100 p.s.i.g.

5. The process of claim 1 where the HF mixture contains 2–15 mole percent monohydric alcohol.

6. The method of claim 1 in which the reactant HF mixture contains about 2 to 20 moles of hydrogen fluoride per mole of monoolefin.

7. The method of claim 6 in which the reactant HF mixture contains about 2 to 5 moles of hydrogen fluoride per mole of monoolefin.

8. A method which comprises reacting monoolefin and carbon monoxide in the presence of an HF mixture containing at least about two moles of hydrogen fluoride per mole of monoolefin and about 5 to 30% water, at a temperature of about 10 to 200° F. and a pressure sufficient to maintain the liquid phase, contacting the product of this reaction with water, separating an HF-water mixture, recycling this mixture to the carbon monoxide reaction and recovering an organic acid.

9. The method of claim 8 in which the reactant HF mixture contains about 2 to 5 moles of hydrogen fluoride per mole of monoolefin.

10. A method which comprises reacting monoolefin and and carbon monoxide in the presence of an HF mixture containing at least about two moles of hydrogen fluoride per mole of monoolefin and about 2 to 25 mole percent monohydric alcohol, at a temperature of about 10 to 200° F. and a pressure sufficient to maintain the liquid phase, contacting the product of this reaction with monohydric alcohol, separating an HF-alcohol mixture, recycling this mixture to the carbon monoxide reaction and recovering an ester.

11. The method of claim 10 in which the reactant HF mixture contains about 2 to 5 moles of hydrogen fluoride per mole of monoolefin.

References Cited in the file of this patent

UNITED STATES PATENTS

| 2,831,877 | Koch | Apr. 22, 1958 |
| 2,863,911 | Buchner et al. | Dec. 9, 1958 |
| 2,876,241 | Koch et al. | Mar. 3, 1959 |